(12) United States Patent
Sandison

(10) Patent No.: US 6,255,659 B1
(45) Date of Patent: Jul. 3, 2001

(54) METHOD AND APPARATUS FOR PASSIVE OPTICAL DOSIMETER COMPRISING CAGED DYE MOLECULES

(75) Inventor: David R. Sandison, Edgewood, NM (US)

(73) Assignee: Sandia Corporation, Albuquerque, NM (US)

(*) Notice: Subject to any disclaimer, the term of this patent is extended or adjusted under 35 U.S.C. 154(b) by 0 days.

(21) Appl. No.: 09/113,686

(22) Filed: Jul. 10, 1998

(51) Int. Cl.[7] ........................................ G01T 1/04
(52) U.S. Cl. ..................... 250/474.1; 250/458.1; 250/461.1; 250/459.1; 250/338.1
(58) Field of Search ............... 250/474.1, 458.1, 250/461.1, 459.1, 338.1

(56) References Cited

U.S. PATENT DOCUMENTS

| 3,787,687 | 1/1974 | Trumble . |
| 3,903,423 | 9/1975 | Zweig . |
| 5,436,115 | 7/1995 | Mullis . |
| 5,581,090 | 12/1996 | Goudjil . |
| 5,719,031 | 2/1998 | Haugland . |

*Primary Examiner*—Constantine Hannaher
*Assistant Examiner*—Andrew Israel
(74) *Attorney, Agent, or Firm*—Brian W. Dodson

(57) ABSTRACT

A new class of ultraviolet dosimeters is made possible by exposing caged dye molecules, which generate a dye molecule on exposure to ultraviolet radiation, to an exterior environment. Applications include sunburn monitors, characterizing the UV exposure history of UV-sensitive materials, especially including structural plastics, and use in disposable 'one-use' optical equipment, especially medical devices.

39 Claims, 6 Drawing Sheets

Figure 4:
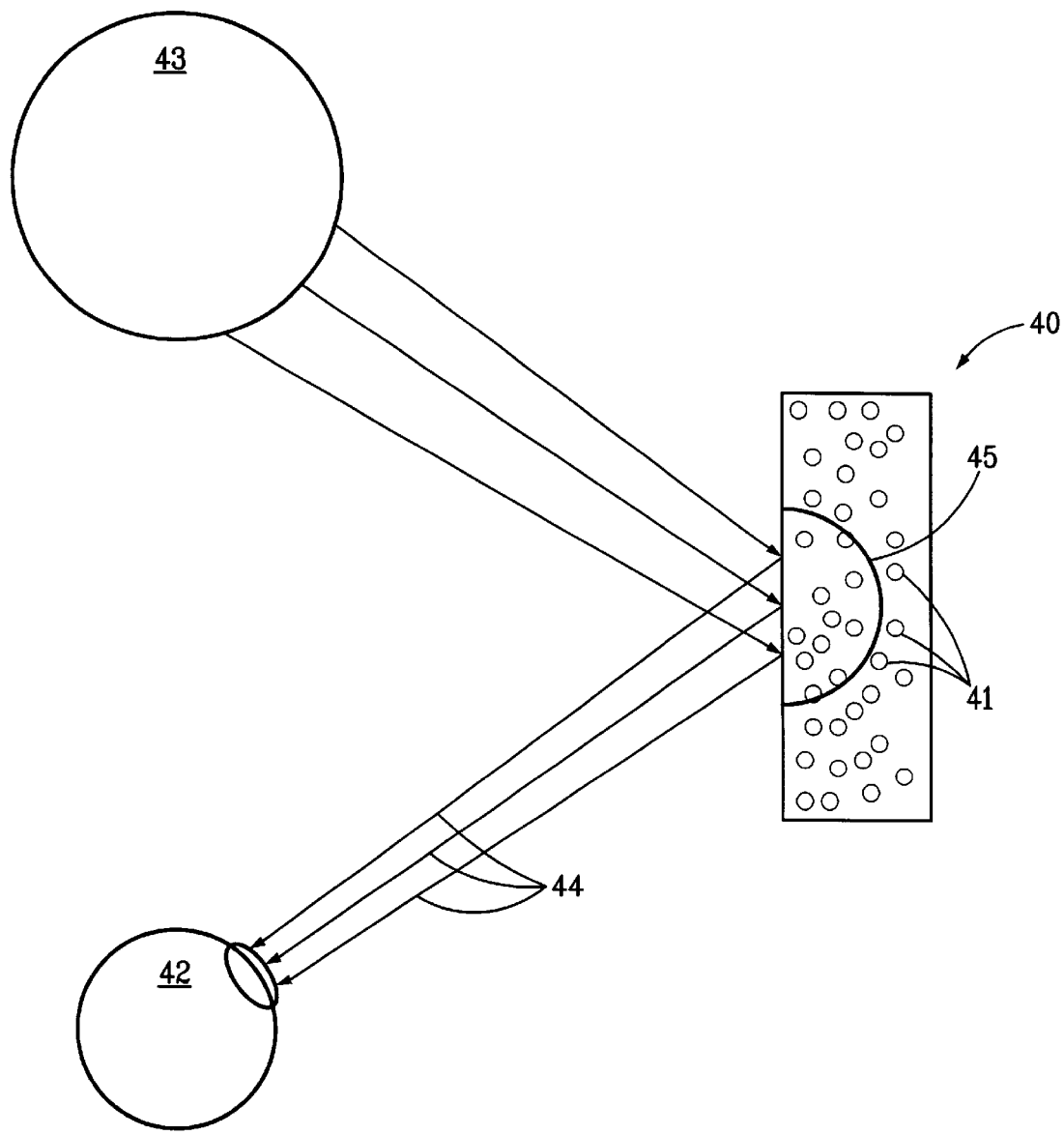

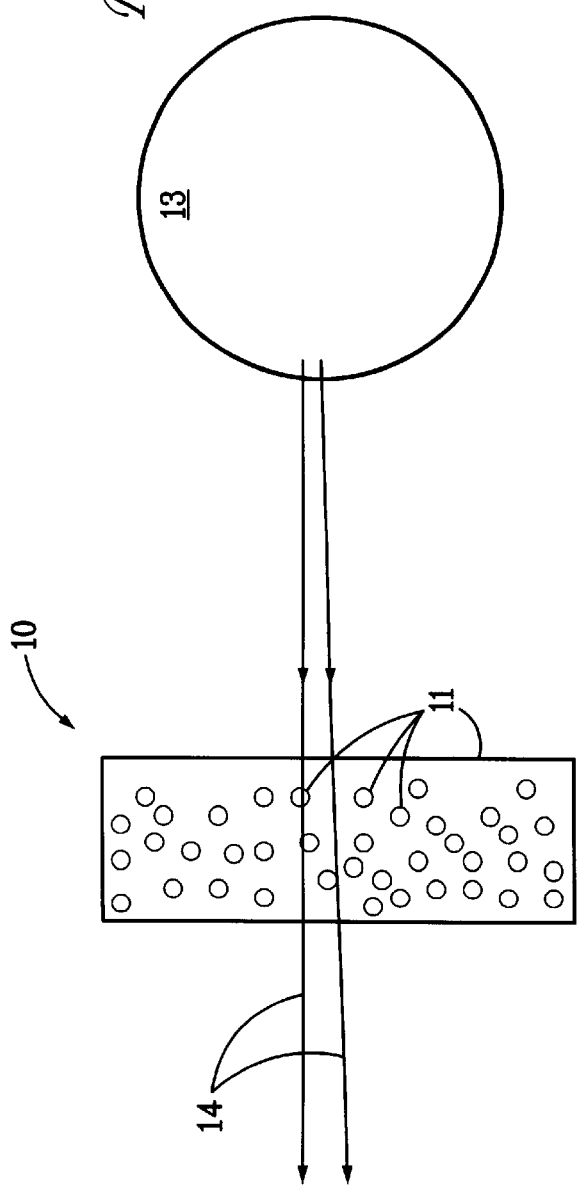
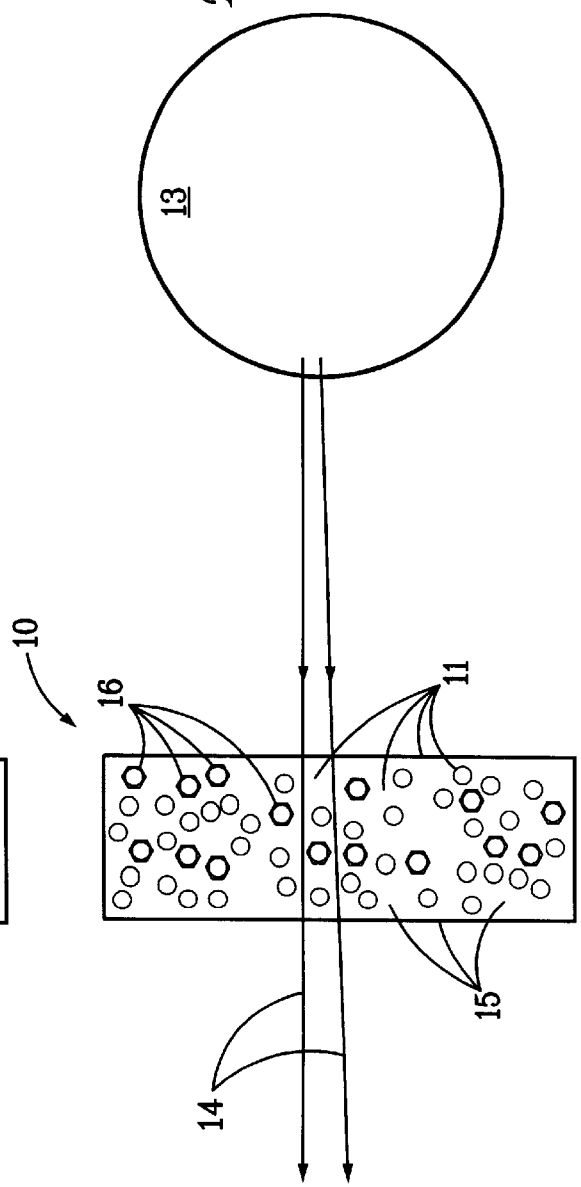

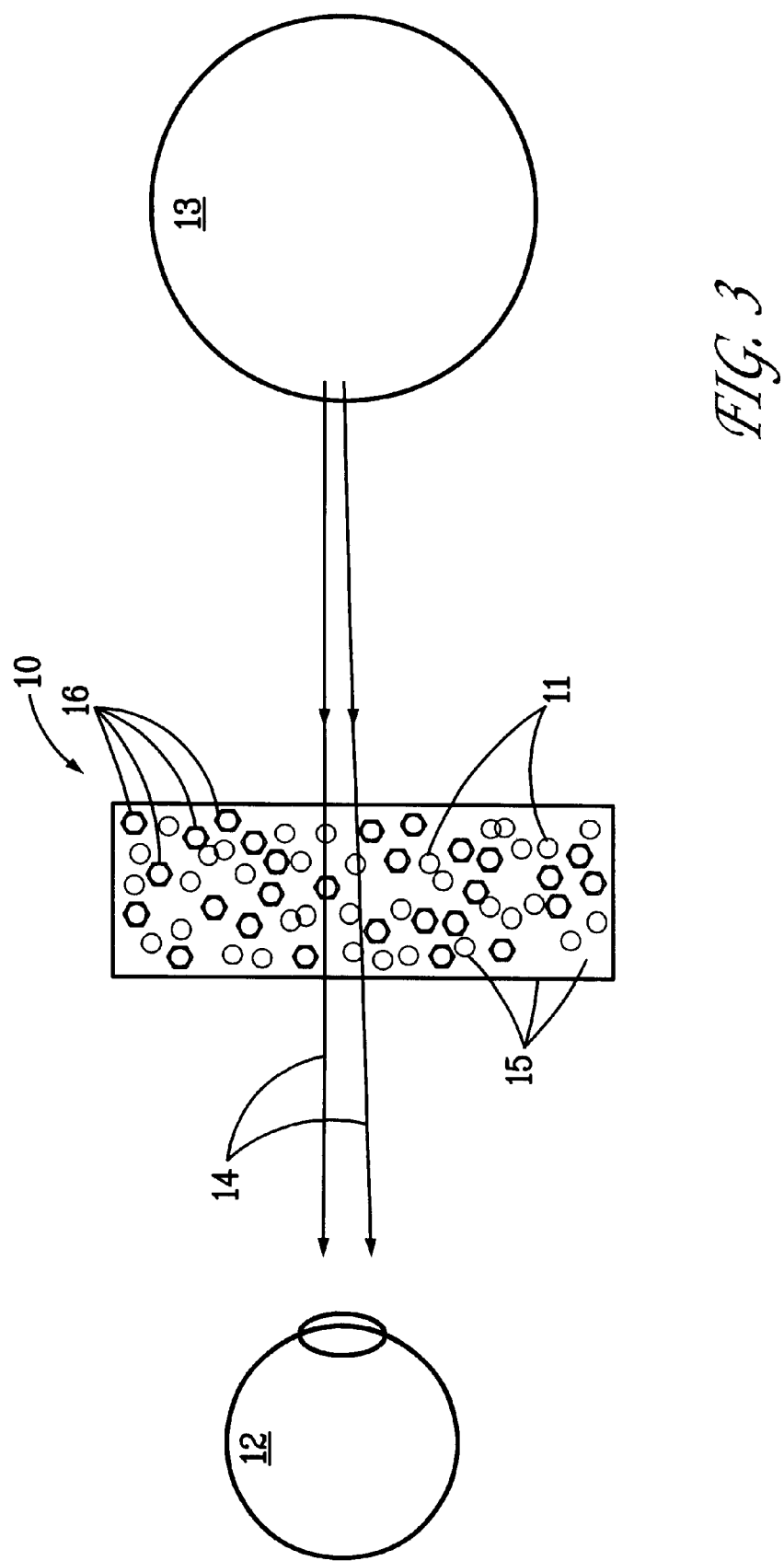

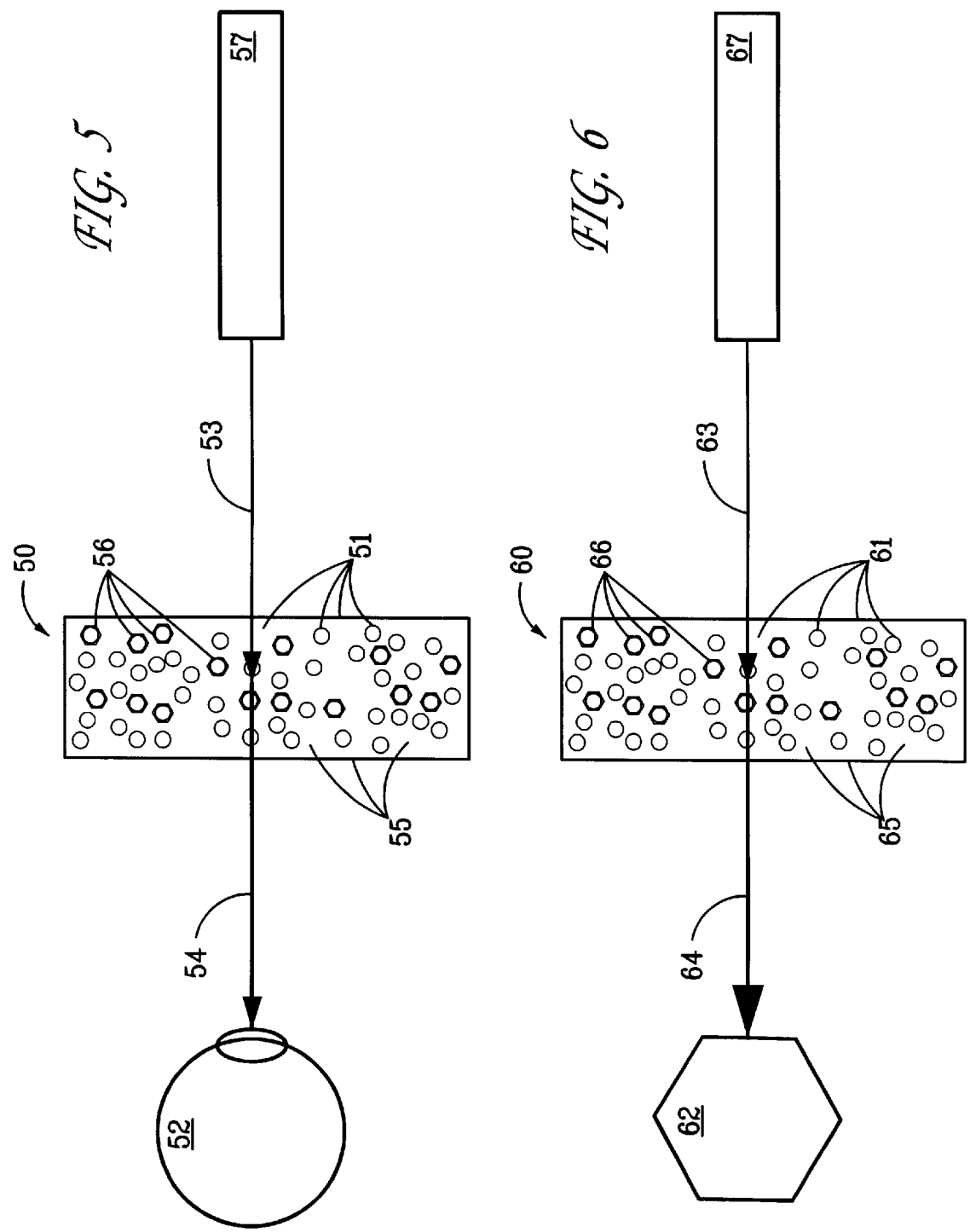

METHOD AND APPARATUS FOR PASSIVE OPTICAL DOSIMETER COMPRISING CAGED DYE MOLECULES

This invention was made with Government support under Contract DE-AC04-94DP85000 awarded by the U.S. Department of Energy. The Government has certain rights in the invention.

BACKGROUND

The present invention relates to method and apparatus to determine the integrated exposure of a material or device to optical (typically ultraviolet) radiation. A specific application is to disposable medical devices.

Ultraviolet light is that portion of the electromagnetic spectrum adjacent to the violet end of the visible spectrum, having wavelengths roughly between 380 nm and 10 nm. Such electromagnetic radiation, as well as some portion of visible light, is energetic enough to induce chemical and/or structural degradation in many materials. In vacuum all wavelengths of radiation propagate, whereas in a standard atmosphere roughly only wavelengths longer than 280 nm are transmitted with little loss. Approximately 10 percent of the energy from the sun is in the ultraviolet.

Because the energy of an ultraviolet photon is greater than the binding energy of many materials and chemical compounds, exposure to ultraviolet radiation can have detrimental effects. Human exposure, for example, can lead to sunburn and skin cancer. Exposure of polymers to ultraviolet radiation can lead to brittleness and coloration. Generation of point and extended defects is commonplace. Because these detrimental effects can be unobvious, time-delayed, or otherwise inconspicuous, it is desirable to have a method and apparatus to allow easy and rapid determination of the total exposure to ultraviolet radiation.

Measurement of total exposure to UV light, or UV dosimetry, is typically accomplished using either electronic devices, such as filtered photodetectors attached to integrating electronics, or by monitoring the quantity of a chemical species which is formed or destroyed by UV light. This latter practice is called actinometry.

Many photoreactions having potential for actinometric applications have been described. One example is the photohydrolysis of 3,4-dimethoxynitrobenzene. The product of this photoreaction does not have visible absorption bands or fluorescence emission. As a result, a UV dosimeter based on such reactions must include a spectrophotometric device, an unsuitable level of complexity for the current task.

Reversible photoreactions have been suggested for use in actinometry. However, their use in UV dosimetry adds considerable complexity and inaccuracy in interpretation of the total exposure, as the current state of the sensitive material depends not only on the total UV exposure but also on the history of that exposure and of other conditions which can effect the rate of reversal of the photoreaction. Accordingly, such reactions are not considered suitable for the present need.

Prior attempts have been made to use actinometric chemical reactions as the basis for an inexpensive and robust indicator of ultraviolet exposure. For example, Trumble (U.S. Pat. No. 3,787,687) used a transparent or white film comprising a 1,3,3-trimethylindolinobenzopyrylospiran. These compounds undergo a chemical reaction on absorbing sufficiently energetic photons, in the process becoming highly absorptive in the visible spectrum. The exposure of the film to ultraviolet was then estimated by comparison with a color chart. This system had the favorable feature that the chemical reaction was reversible on heating the film, allowing reuse of the dosimeter. However, the photoactive molecules rapidly degraded on exposure to visible, as well as ultraviolet light, leading to inadequate service life for many applications.

A physically and chemically similar system was proposed by Goudjil (U.S. Pat. No. 5,581,090), who replaced the spirobenzopyran derivatives used by Trumble with spirooxazines chosen for ultraviolet sensitivity and resistance to degradation. He was successful, but the resulting ultraviolet sensitive material is not suited for measurement of integrated exposure to ultraviolet, as the color-producing reaction is rapidly reversible.

To summarize, although numerous actinometric systems for the measurement of ultraviolet light exposure have been proposed, none thoroughly address the desire for a simple, inexpensive, and easy to read ultraviolet dosimeter.

A specific application for such an ultraviolet dosimeter is in disposable optical probes, especially for medical diagnosis. If the disposable probe contains a UV dosimeter, and the apparatus to which the probe attaches emits a pulse of ultraviolet light in the course of the desired measurement, then the UV dosimeter of a new probe will comprise no free dye molecules, whereas the UV dosimeter of a probe which has been used previously will have free dye molecules. In order to prevent overuse of such a probe, the apparatus can be configured so as to look for the color (or the fluorescence) of the free dye molecules prior to operation. If the number of free dye molecules is large enough, the apparatus will refuse to function. A case of special interest is when the possibility of contamination is present, and the number of free dye molecules resulting from one prior use is sufficient to prevent operation.

The present invention seeks to satisfy the aforementioned needs by introducing a new class of UV dosimeter. Various embodiments and other features, aspects, and advantages of the present invention will become better understood with reference to the following description and appended claims.

SUMMARY

The present application is directed to a new class of optical dosimeters which measure integrated exposure to specific (typically ultraviolet) bands of electromagnetic radiation. The basis for the present invention are ultraviolet sensing materials comprising photoactive molecules disposed within a body, which react to ultraviolet irradiation by undergoing a chemical reaction which generates a species which acts as a dye. A dye absorbs incident light in a characteristic band of wavelengths. Dyes may also fluoresce, removing the energy they collect in absorption by emitting lower-energy photons, again in a characteristic wavelength band.

An example of such photoactive molecules are the class of caged dye molecules. These are dye molecules covalently bonded to a cage molecule which quenches the ability of the dye molecule to absorb light. UV light can photolyze the cage molecule from the dye molecule, thereby allowing the coloring effects of the dye molecule to appear.

When the photoactive molecules within the ultraviolet sensing material are exposed to ultraviolet light, the concentration of dye molecules increases. The total exposure of the sensor is determined by measuring the spectral absorption or fluorescent emission of the sensor. Such ultraviolet sensing materials can be used to monitor exposure to ultraviolet radiation in numerous situations, including structural materials, sunburn medications, and disposable optical probes.

BRIEF DESCRIPTION OF THE ILLUSTRATIONS

FIG. 1 schematically illustrates an ultraviolet dosimeter according to the instant invention prior to ultraviolet exposure.

FIG. 2 schematically illustrates an ultraviolet dosimeter according to the instant invention following an intermediate ultraviolet exposure.

FIG. 3 schematically illustrates an ultraviolet dosimeter according to the instant invention following an ultraviolet exposure sufficient to saturate the dosimeter.

FIG. 4 schematically illustrates an ultraviolet dosimeter wherein the exposure to ultraviolet radiation changes the color of light scattered from a surface.

FIG. 5 schematically illustrates an ultraviolet dosimeter wherein the intensity of fluorescence of free dye molecules indicates the total exposure to ultraviolet.

FIG. 6 schematically illustrates the use of a photodetector to measure the amount of fluorescence emitted by a dosimeter.

Figure 7:
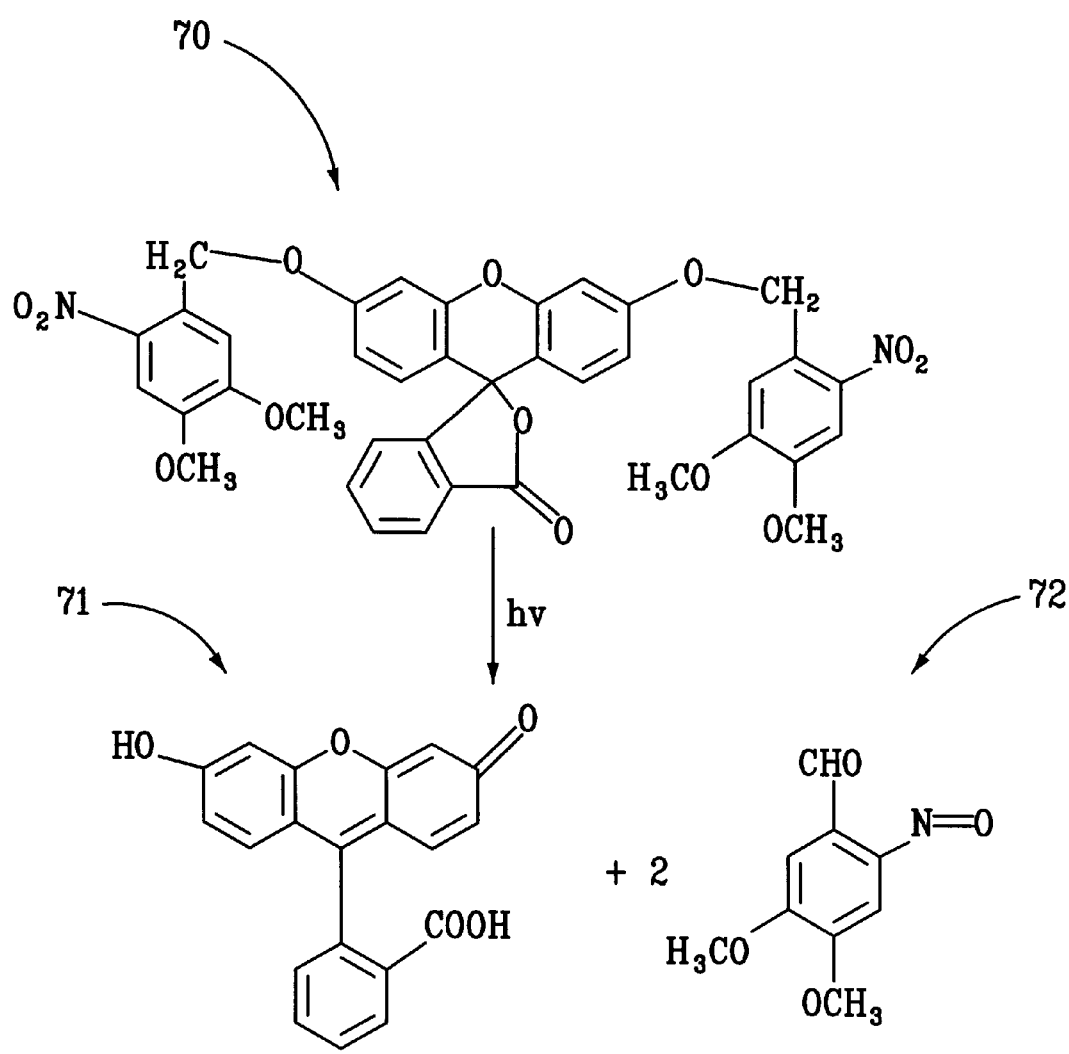

FIG. 7 schematically illustrates the photolysis of caged fluorescein into a cage molecule and free fluorescein on absorbing an ultraviolet photon with energy hv.

FIG. 8 schematically illustrates a disposable probe which automatically tells the operator if it has previously been used, or if it is still within an expected operating life.

DETAILED DESCRIPTION

The instant invention is based on the properties of a class of organic compounds known as caged dye molecules. These molecules comprise an organic dye moiety and a caging moiety which are covalently bonded so that the caging moiety inactivates the dye moiety. When a photon of sufficient energy is absorbed, the covalent bond photolyzes, and a cage molecule and a free dye molecule are produced. The free dye molecules color the material in which they reside, and produce a color (or an intensity of fluorescence) that is proportional to the total exposure of the material to ultraviolet light. The color density (or fluorescence intensity) will typically be proportional to the total UV exposure over a wide range of exposures. The photolysis is essentially irreversible (contrary to the photoreaction observed in, e.g., spirooxazines and related compounds) so that corrections for reversal of the material coloration need not be made, again leading to a UV dosimeter which is simple to use.

The dye molecules in caged dye molecules are inactivated by their interaction with the caging moiety, but when free they can be either colored (e.g., absorb light) or fluorescent or both when released from the caging moiety. These properties are typically based upon the electronic properties of specific excitation modes of the (usually) aromatic organic dye molecule. The dye molecule, once freed from the cage molecule, either absorbs light in a given spectral range, thereby acquiring a color by absorption, or absorbs light at a shorter wavelength and emits light at a longer wavelength by fluorescence. Note that nonradiative deexcitation processes can reduce or virtually eliminate fluorescence in certain classes of dye molecules, or in some dye molecules in particular environments (e.g., polar solvents). For the instant invention either the absorption band or the emission band (if present) can be used to measure the extent of exposure. The band in the visible spectrum will typically, but not necessarily, be chosen for readout of the dosimeter so that it can be read without requiring complex equipment.

The process of using a dosimeter after the instant invention is illustrated schematically in FIGS. 1–3. FIG. 1 shows the dosimeter prior to any exposure to ultraviolet light. Caged dye molecules 11 are dispersed inside dosimeter 10. Inspection by eye 12 of light 14 from light source 13 after it has passed through the dosimeter shows no coloration owing to free dye molecules. (The light source can be sunlight or any source of ambient light as well as the dedicated light source shown in FIG. 1.)

FIG. 2 shows dosimeter 10 following a period of ultraviolet exposure. At this exposure level roughly 40% of the caged dye molecules have undergone photolysis, generating cage molecules 15 and free dye molecules 16. Inspection now reveals a change in the light 14 which is proportional both to the amount of ultraviolet exposure and to the initial concentration of caged dye molecules in the dosimeter 10.

Finally, FIG. 3 shows dosimeter 10 after it is saturated with ultraviolet exposure. Nearly all of the caged dye molecules 11 have undergone photolysis into cage molecules 15 and free dye molecules 16. Inspection now reveals a strong coloration of the light 14 from the free dye molecules, and the coloration from the free dye molecules will not increase with further ultraviolet exposure, as there are essentially no more caged dye molecules to be photolysed.

The above examples have focused on detecting the amount of ultraviolet exposure by altering the color of light transmitted through the UV dosimeter. Another approach is shown in FIG. 4, where detection and measurement of the amount of ultraviolet exposure depends on an alteration in the color of reflected light. Here a scattering dosimeter 40 containing caged dye molecules 41 is exposed to light source 43. Light 44 hits the surface of dosimeter 40, scatters within 40 in the region 45, and escapes to be seen with the eye 42. Light 44 undergoes a change in color as it interacts with uncaged dye molecules in region 45. The change in color is roughly proportional to the amount of ultraviolet to which the dosimeter 40 has been exposed.

As mentioned earlier, an ultraviolet dosimeter after the present invention can be based on fluorescence of the free dye molecules, rather than on their absorptive properties. Such a dosimeter is shown in FIG. 5, where a dosimeter 50 containing caged dye molecules 51 has been exposed to a considerable dose of ultraviolet radiation, so that many of the caged dye molecules have photolyzed into cage molecules 55 and free dye molecules 56. To read the dosimeter 50, it is exposed to radiation 53, which is generated by light source 57 at a wavelength suited to excite the free dye molecules 56 to fluorescence. (The light source 57 can be sunlight or any source of ambient light as well as the dedicated light source shown in FIG. 5, provided that light of sufficient energy to excite fluorescence in the free dye molecules 56 is thereby provided.)

The free dye molecules in the dosimeter then fluoresce, emitting light 54 of a longer wavelength. In the dosimeter pictured in the figure, this fluorescence occurs in the visible, and is detected by eye 52. In the usual case, the exciting light 53 will be in the ultraviolet, although certain dye molecules can be stimulated to fluoresce by higher energies of visible light. If the exciting light 53 is in the ultraviolet, all the eye will see is the fluorescent output 54. The intensity of that output will allow the total exposure of the dosimeter to be estimated. Note that dosimeter designs analogous to that of FIG. 4 but based on detecting fluorescence in the dosimeter are also possible, and their design will be clear to one skilled in the art.

The human eye is not always a suitable detector for an ultraviolet dosimeter according to the present invention. The designs which depend on a change in color based on the absorbing properties of the free dye molecule cannot be read by eye if the free dye molecules absorb only light not of the visible spectrum. Similarly, the designs which depend on visible fluorescence will not function if the free dye molecules only exhibit fluorescence outside the visible spectrum.

Such limitations can be circumvented by the use of optical detectors, such as are shown in FIG. 6 for an in-line fluorescence ultraviolet dosimeter. (Note that such a detector can also be used with visible light.) Here dosimeter 60 contains a mixture of caged dye molecules 61, cage molecules 65, and free dye molecules 66. The free dye molecules 66 absorb at one ultraviolet wavelength 63 supplied by light source 67, and emit fluorescence 64 at a longer ultraviolet wavelength. Optical detector 62 is sensitive only to the fluorescence radiation 64, and measures the intensity of the fluorescence. The ratio of the intensity of the light source and the intensity of the fluorescence can be converted to knowledge of the total ultraviolet exposure of the dosimeter 60.

Note that similar techniques can be used for absorbing dosimeters, where an optical detector can be used to measure the ratio between the intensity of light 64 after dosimeter 60 was exposed to ultraviolet and the intensity of light 64 before dosimeter 60 was exposed to ultraviolet can be converted to knowledge of the total ultraviolet exposure of dosimeter 60. These and other related implementations are intended to be included in the scope of the instant invention.

Caged dye molecules are commercially available from several chemical suppliers. The structure of one example, a caged fluorescein dye, is shown in FIG. 7. Here the fluorescein molecule 71 and the cage molecule 1-(4,5-dimethoxy-2-nitro)benzaldehyde 72 are the photolysis products of the caged fluorescein 70. The fluorescein molecule 71 itself is intensely fluorescent, but the caged molecule 70 is colorless and nonfluorescent until it is photolyzed on absorbing a photon with wavelength less than but about 365 nm.

The usual application of such caged dye molecules is in studying kinetics and pathways of biochemical processes at the cellular level. Applications in time-resolved studies of fluid dynamics have also been proposed, but the current application to measure UV exposure does not appear in the prior art.

Applications for ultraviolet dosimeters according to the present invention include people wearing such a dosimeter to monitor their skin's exposure to sunlight. This could help prevent acute sunburn, which shows no obvious symptoms until well after damage to the skin has been done, as well as provide feedback to help a user make lifestyle adjustments in an attempt to reduce the rate of sun-induced skin aging.

A major difficulty with use of many plastics for structural applications is that their structural properties degrade with exposure to sunlight (again with ultraviolet radiation being the primary cause). Such plastics may weaken and become brittle with little or no visible sign of their degraded condition. This is especially important in high-risk applications, such as polycarbonate-based bulletproof windows. These are regularly applied to use as windshields and windows in armored cars. After a year's exposure to sunlight, however, such windows will lose a significant proportion of their ability to resist penetration by a bullet. Exactly how much loss occurs depends on the type of use, how the vehicle is stored, and the geographic area of use. No good nondestructive test for degradation currently exists. If a small proportion of caged dye molecules were dispersed throughout the polycarbonate, or were concentrated in one or many local sites in such a window, the change in color could alert the operator to a dangerous condition, while avoiding the need to routinely replace fully functional windows to be sure of maintaining the safety of the vehicle.

Figure 8A:
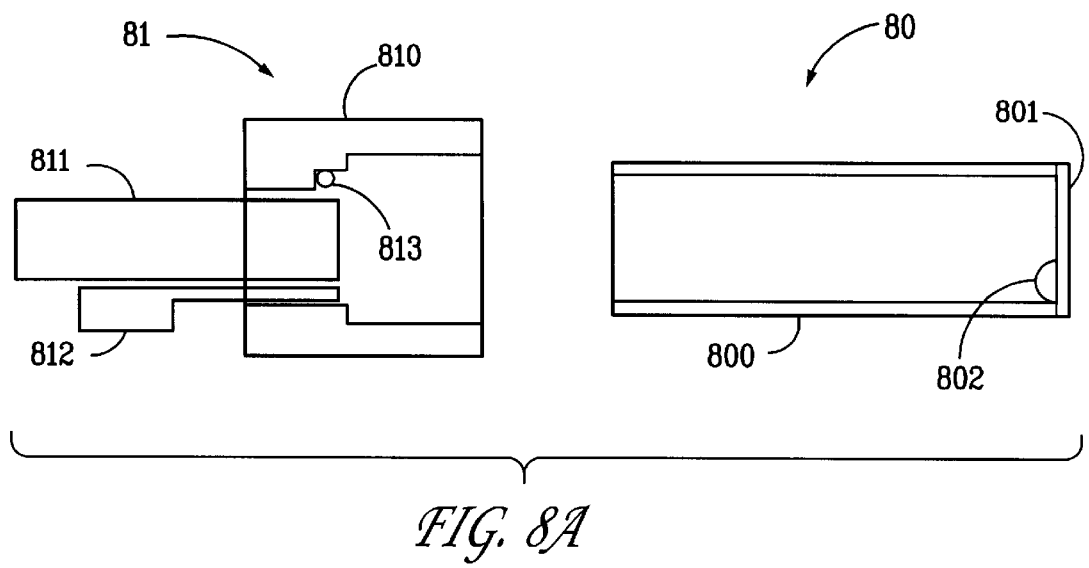

FIG. 8 shows another class of applications of the present invention. In FIG. 8a appears a replaceable probe assembly 80, which consists of, in this specific example, a tube 800, and optical window 801, and a small dot of material 802 containing caged dye molecules. This assembly fits into a housing 81, which comprises a mount 810, into which are affixed a camera 811, a fluorescence detector 812, and a fluorescence light source 813. Mount 810 is equipped with a mounting socket into which probe assembly 80 slides.

Figure 8B:
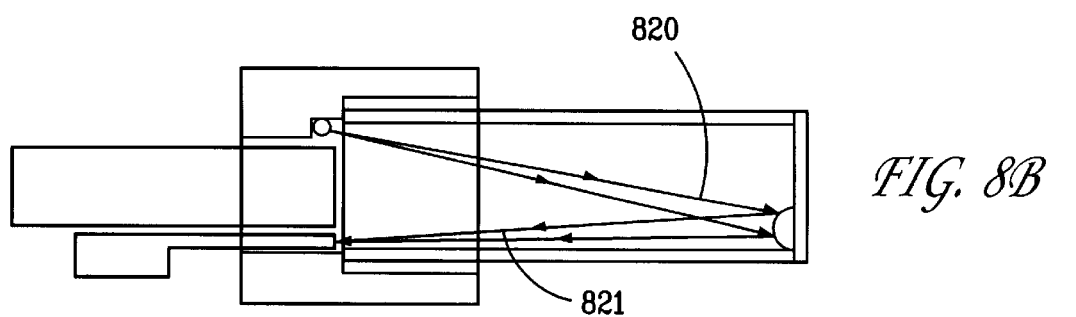
Figure 8C:
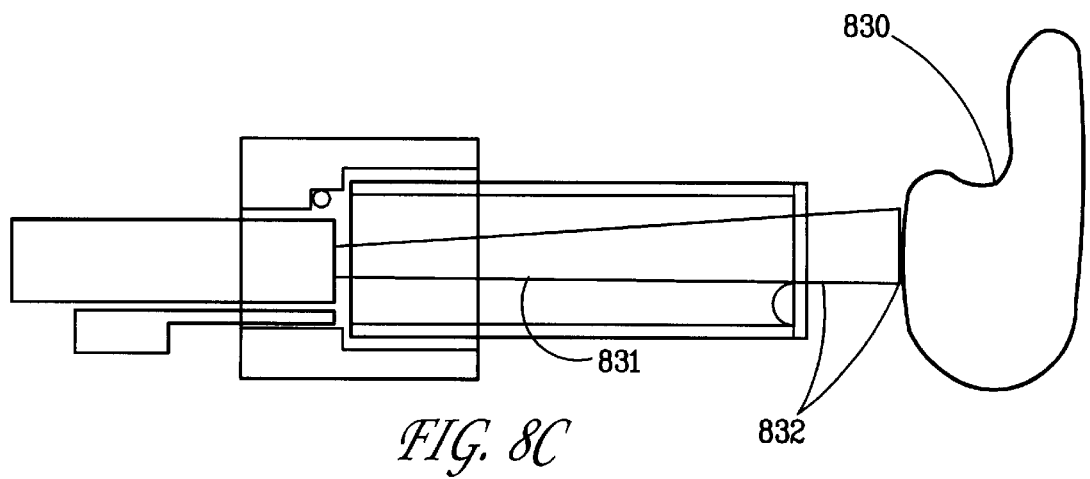

FIG. 8b shows the housing with a disposable probe assembly affixed. Before the probe is used, light 820 is emitted from the fluorescence light source 813. Light 820 is at the correct wavelength to stimulate any free dye molecules in dot 802 to fluoresce. Any fluorescent output 821 generated by the action of light 820 will then be detected by the fluorescence detector 812. If more than a prescribed amount of fluorescence is detected, then the useful life of the probe assembly is known to be over, and it is removed for disposal.

If less than the prescribed amount of fluorescence is detected, the probe is accepted for the upcoming use. At some point during that use the dot 802 is exposed to ultraviolet radiation having a wavelength which will photolyze the caged dye molecules, thereby producing free dye molecules in the dot. The source of the ultraviolet radiation is not shown in FIG. 8, but may be provided by the light used by camera 811 during the intended application (e.g., observing object 830 in FIG. 8c), or may be specially supplied by a dedicated source. The idea is to insure that either the time over which the probe has been used, or the number of operational cycles to which the probe has been subjected, is encoded in the total number of free dye molecules in dot 802, and the resulting signal output from fluorescence detector 812.

The reason to replace the probe periodically, rather simply upon breakage, may be due to degradation of some element of the probe (e.g., due to exposure to harsh environments), or, in a wide class of applications, because the probe may have become contaminated in an initial use. When gradual degradation is of concern, the prescribed amount of fluorescence upon which the probe is to be discarded will be that appropriate to the safe limits of exposure of the probe to operating conditions. When contamination is the issue, e.g., when the probe is for internal medical examination, then the prescribed amount of fluorescence is less than that generated by the dye molecules freed in a single operational cycle of the apparatus. As the apparatus is used to check the level of fluorescence prior to each use, this invention prevents accidental reuse of a disposable probe. If the level of fluorescence triggers an interlock control (not shown), this invention prevents any reuse of a disposable probe.

Various implementations of the instant invention and applications thereof have been described in the proceeding. The extent of the invention is not intended to be limited to these implementations, however, but only by the appended claims.

What is claimed is:

1. An ultraviolet dosimeter, comprising caged dye molecules which photolyze on exposure to ultraviolet radiation, thereby generating a density of free dye molecules.

2. The dosimeter of claim 1, wherein the density of free dye molecules is proportional to the total exposure of the dosimeter to ultraviolet radiation.

3. The dosimeter of claim 1, further comprising optical means to measure the density of free dye molecules.

4. The dosimeter of claim 3, wherein said optical means measures the ability of the density of free dye molecules to absorb light at a characteristic wavelength.

5. The dosimeter of claim 4, wherein the characteristic wavelength is within the visible spectrum.

6. The dosimeter of claim 5, wherein measuring the density of free dye molecules comprises visual evaluation of a color resulting from the absorption of the density of free dye molecules.

7. The dosimeter of claim 3, wherein said optical means measures the intensity of fluorescence emitted by the density of free dye molecules at a fluorescence wavelength in response to exposure to a fluorescence excitation source.

8. The dosimeter of claim 7, wherein the fluorescence wavelength is within the visible spectrum.

9. The dosimeter of claim 8, wherein measuring the intensity of fluorescence of the density of free dye molecules comprises visual evaluation of the fluorescent emission therefrom.

10. The dosimeter of claim 3, wherein said optical means comprise a spectrophotometer.

11. An ultraviolet indicating material, comprising caged dye molecules which photolyze on exposure to ultraviolet radiation, thereby generating a density of free dye molecules, said caged dye molecules being dispersed within a material.

12. The material of claim 11, wherein the density of free dye molecules within the material is proportional to the total exposure of the material to ultraviolet radiation.

13. The material of claim 11, wherein the material is an organic polymer.

14. The material of claim 13, wherein the organic polymer is chosen from the group consisting of polymethylmethacrylate, polycarbonate, polystyrene, polyethylene, and co-polymers and blends thereof.

15. The material of claim 11, wherein the total exposure of the material to ultraviolet radiation can be evaluated by measuring the density of free dye molecules.

16. The material of claim 15, wherein the density of free dye molecules can be measured by determining the ability of the density of free dye molecules to absorb light at a characteristic wavelength.

17. The material of claim 16, wherein the characteristic wavelength is within the visible spectrum.

18. The material of claim 17, wherein measuring the density of free dye molecules comprises visual evaluation of a material color resulting from the absorption of the density of free dye molecules.

19. The material of claim 15, wherein the density of free dye molecules can be measured by determining the intensity of fluorescence emitted by the density of free dye molecules at a fluorescence wavelength in response to exposure to a fluorescence excitation source.

20. The material of claim 16, wherein the fluorescence wavelength is within the visible spectrum.

21. The material of claim 20, wherein measuring the intensity of fluorescence of the density of free dye molecules comprises visual evaluation of the fluorescent emission therefrom.

22. The material of claim 21, wherein the fluorescence excitation source comprises sunlight.

23. An apparatus comprising
   a) a replaceable limited-life implement which comprises caged dye molecules;
   b) an ultraviolet exposing means which exposes the caged dye molecules to a known amount of ultraviolet radiation each time the apparatus is utilized;
   c) a density of free dye molecules generated from the caged dye molecules by said known amount of ultraviolet radiation; and,
   d) optical means to measure the density of free dye molecules in the implement.

24. The apparatus of claim 23, wherein the optical means measure the optical absorption of the density of free dye molecules in the implement.

25. The apparatus of claim 24, wherein the density of free dye molecules absorb light in the visible spectrum.

26. The apparatus of claim 25, wherein the optical absorption of the density of free dye molecules can be measured by visual evaluation of a color resulting from the absorption of the density of free dye molecules.

27. The apparatus of claim 23, wherein the optical means measure the amount of fluorescence emitted by the density of free dye molecules at a fluorescence wavelength in response to exposure to a fluorescence excitation source.

28. The apparatus of claim 27, wherein the density of free dye molecules fluoresce in the visible spectrum.

29. The apparatus of claim 28, wherein measuring the amount of fluorescence emitted by the density of free dye molecules at a fluorescence wavelength comprises visual evaluation of the fluorescent emission therefrom.

30. The apparatus of claim 23, further comprising interlocking means to prevent operation of the apparatus if the density of free dye molecules exceeds a preset threshold.

31. The apparatus of claim 30, wherein the preset threshold is lower than the density of free dye molecules generated by a single previous use of the implement.

32. A structural material, comprising a polymer containing caged dye molecules such that an optical indication of degradation owing to ultraviolet exposure is provided by measuring the density of free dye molecules.

33. The material of claim 32, wherein the organic polymer is chosen from the group consisting of polymethylmethacrylate, polycarbonate, polystyrene, polyethylene, and co-polymers and blends thereof.

34. The apparatus of claim 32, wherein measuring the density of free dye molecules is accomplished by measuring their optical absorption.

35. The apparatus of claim 33, wherein the density of free dye molecules absorb light in the visible spectrum.

36. The apparatus of claim 35, wherein the density of free dye molecules can be measured by visual evaluation of a color resulting from the absorption of the density of free dye molecules.

37. The apparatus of claim 32, wherein measuring the density of free dye molecules is accomplished by measuring the amount of fluorescence emitted thereby in response to exposure to a fluorescence excitation source.

38. The apparatus of claim 37, wherein the density of free dye molecules fluoresce in the visible spectrum.

39. The apparatus of claim 38, wherein measuring the amount of fluorescence emitted by the density of free dye molecules at a fluorescence wavelength comprises visual evaluation of the fluorescent emission therefrom.

* * * * *